(12) United States Patent
Pregnolato et al.

(10) Patent No.: US 8,915,159 B2
(45) Date of Patent: Dec. 23, 2014

(54) GEAR-CHANGE DEVICE FOR A MOTOR VEHICLE

(75) Inventors: Gianluigi Pregnolato, Turin (IT); Andrea Piazza, Turin (IT)

(73) Assignee: C.R.F. Societá Consortile per Azioni, Orbassano (Torino) (IT)

( * ) Notice: Subject to any disclaimer, the term of this patent is extended or adjusted under 35 U.S.C. 154(b) by 243 days.

(21) Appl. No.: 13/565,049

(22) Filed: Aug. 2, 2012

(65) Prior Publication Data

US 2013/0145897 A1   Jun. 13, 2013

(30) Foreign Application Priority Data

Dec. 7, 2011  (EP) ..................................... 11192318

(51) Int. Cl.
*F16H 3/08* (2006.01)
(52) U.S. Cl.
USPC ........................................................... 74/330
(58) Field of Classification Search
CPC .. F16H 3/006; F16H 2003/0931; F16H 3/093
USPC ........................................... 74/330, 331, 340
See application file for complete search history.

(56) References Cited

U.S. PATENT DOCUMENTS

| | | | | |
|---|---|---|---|---|
| 6,067,870 A * | 5/2000 | Fleishman et al. | ............... | 74/331 |
| 7,690,278 B2 | 4/2010 | Burgardt et al. | | |
| 7,950,302 B2 * | 5/2011 | Burgardt et al. | ................. | 74/331 |
| 8,307,729 B2 * | 11/2012 | Chazotte | .......................... | 74/331 |
| 2007/0277635 A1 * | 12/2007 | Komori | ........................... | 74/340 |
| 2010/0288064 A1 | 11/2010 | Singh et al. | | |
| 2011/0030506 A1 | 2/2011 | Singh et al. | | |
| 2011/0138944 A1 * | 6/2011 | Mohlin et al. | ................... | 74/331 |
| 2011/0265601 A1 | 11/2011 | Pastorello et al. | | |

FOREIGN PATENT DOCUMENTS

| | | |
|---|---|---|
| DE | 102004056936 B4 | 2/2011 |
| WO | 2006056325 A2 | 6/2006 |

OTHER PUBLICATIONS

European Search Report dated Apr. 4, 2012 issued by the European Patent Office relative to European Application No. 11192318.1 to which priority is claimed by the current application.

* cited by examiner

*Primary Examiner* — Ha D Ho
(74) *Attorney, Agent, or Firm* — Heslin Rothenberg Farley & Mesiti P.C.; Victor A. Cardona, Esq.

(57) ABSTRACT

A gear-change device for a motor vehicle includes a first primary shaft and a second primary shaft, A first secondary shaft has an output pinion set within the length between two end bearings that support in rotation the first secondary shaft, while a second secondary shaft has an output pinion set on the outside of a length between two end bearings that support in rotation the second secondary shaft, on a portion of the second secondary shaft that projects in cantilever fashion beyond the bearing adjacent thereto. A parking gear wheel has an axial position substantially displaced with respect to the axial position of a forward gear wheel on the second secondary shaft in such a way that the first secondary shaft is surrounded by a free space in the portion axially aligned with the forward gear wheel.

5 Claims, 3 Drawing Sheets

GEAR-CHANGE DEVICE FOR A MOTOR VEHICLE

CROSS REFERENCE TO RELATED APPLICATIONS

This application claims priority from European patent application No. 11192318.1, filed on Dec. 7, 2011, the entire disclosure of which is incorporated herein by reference.

FIELD OF THE INVENTION

The present invention relates to gear-change devices for motor vehicles, of the type comprising:

a first primary shaft and a second primary shaft, which are coaxial and can be connected selectively to the engine shaft of the motor vehicle by means of a double-clutch device;

a first secondary shaft and a second secondary shaft, the axes of which are parallel and set at a distance from the common axis of said primary shafts, and which have respective output pinions that are to mesh with the gear wheel of a differential, said output pinions being in axial positions aligned with one another;

a plurality of pairs of gear wheels, corresponding to a plurality of forward gears and to at least one reverse gear, wherein one of the gear wheels of each pair is rigidly connected in rotation to one of the primary shafts or to one of the secondary shafts, whilst the other is set so that it can turn freely on one of the secondary shafts or on one of the primary shafts, respectively;

a plurality of devices for selecting the gears for coupling each of said freely rotating gear wheels in rotation with the shaft on which it is mounted, wherein the reverse gear is defined by:

a first reverse gear wheel mounted so that it can turn freely on the first secondary shaft and can be connected in rotation to the latter by means of one of said gear-selection devices in order to select the reverse gear;

a second reverse gear wheel, which functions as idle gear wheel for reversal of motion, which meshes with said first reverse gear wheel and is mounted so that it can turn freely on the second secondary shaft, said second reverse gear wheel being permanently connected in rotation to a forward gear wheel that is mounted so that it can turn freely on the aforesaid second secondary shaft and meshes with a gear wheel rigidly connected in rotation on one of said primary shafts, wherein rigidly mounted on said first secondary shaft is a parking gear wheel co-operating with a blocking device for locking the gear-change device in a parking condition.

A gear-change device of the type referred to previously is described in the document No. DE 10 2004 056 936 and in the corresponding U.S. Pat. No. 7,690,278 B2 and the corresponding document No. WO 2006/056325.

OBJECT OF THE INVENTION

The object of the present invention is to provide a gear-change device of the type specified above that is simple and functional from the constructional standpoint.

SUMMARY OF THE INVENTION

With a view to achieving the above purpose, the subject of the invention is a gear-change device having all the characteristics referred to previously and moreover characterized in that:

said first secondary shaft has its output pinion set within the length between two end bearings that support in rotation said first secondary shaft, whilst said second secondary shaft has its output pinion set outside the length between two end bearings that support said second secondary shaft in rotation, on a portion of the second secondary shaft that projects in cantilever fashion beyond the bearing adjacent thereto; and the aforesaid parking gear wheel has an axial position substantially displaced with respect to the axial position of said forward gear wheel on the second secondary shaft in such a way that said first secondary shaft (2A) is surrounded by a free space in the portion axially aligned to said forward gear wheel.

Thanks to the aforesaid characteristics, the aforesaid forward gear wheel, which is typically the gear wheel of the second gear, can be made with a relatively large diameter so as to enable a transmission ratio of the second gear that is relatively close to the transmission ratio of the first gear, which in certain cases may be desirable. Moreover, the gear-change device according to the invention allows the designer greater possibilities of choice in arranging the various members of the gear-change, and in particular the members associated to the parking-lock device, on the basis of the spaces available.

BRIEF DESCRIPTION OF THE DRAWINGS

The present invention will now be described with reference to the annexed drawings, which are provided purely by way of example and in which.

DETAILED DESCRIPTION OF THE INVENTION

Figure 1:
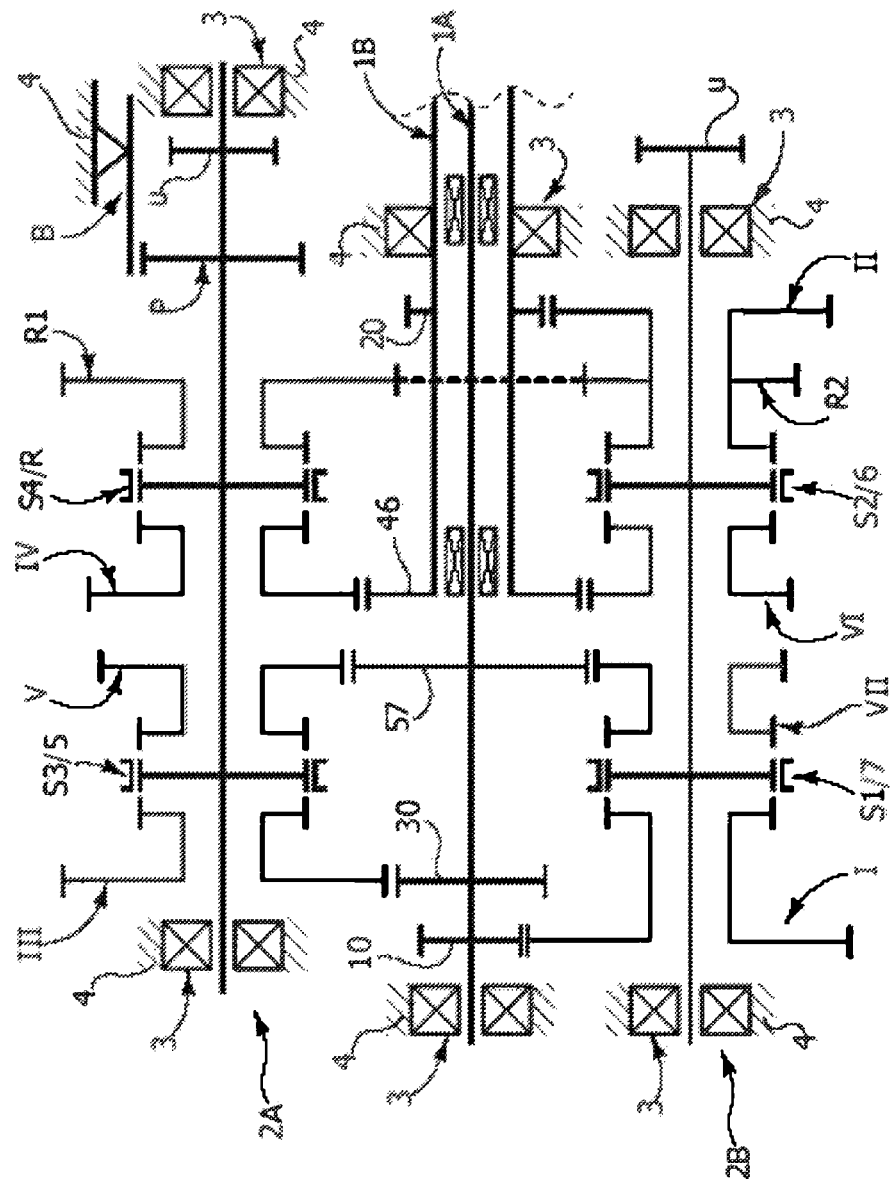
FIG. 1 is a diagram of a first embodiment of the gear-change device according to the invention.

With reference to FIG. 1, number 1 designates as a whole a gear-change device for a motor vehicle, comprising a first primary shaft 1A and a second primary shaft 1B that are coaxial, the right-hand ends of which (as viewed in the figures) can be selectively connected to the engine shaft of a motor vehicle by means of a double-clutch device of any known type (not illustrated).

The references 2A, 2B designate as a whole a first secondary shaft and a second secondary shaft, the axes of which are parallel and set at a distance from the common axis of the two primary shafts 1A, 1B.

For greater clarity, the figures show the shafts 1A, 1B, 2A, 2B as if they had their three axes all set in the same plane, whereas said axes are not in actual fact coplanar but rather are set in a triangle.

All the aforesaid shafts are rotatably supported by means of rolling bearings 3 within the casing 4 of the gear-change.

The two secondary shafts 2A, 2B have at their right-hand ends (as viewed in the figures) output pinions u that are both to mesh, in a way in itself known, with a gear wheel of a differential (not illustrated). The pinions u consequently have axial positions aligned with one another.

The gear-change device illustrated has a plurality of pairs of gear wheels, corresponding to the plurality of forward gears and to a reverse gear, wherein one of the gear wheels of each pair is rigidly connected in rotation to one of the primary shafts or to one of the secondary shafts, whilst the other is set so that it can turn freely respectively, in the two cases, on one of the secondary shafts or on one of the primary shafts. Moreover, once again according to conventional techniques, the device comprises a plurality of devices for selecting the gears designed to couple each of said freely rotating gear wheels in rotation with the shaft on which it is mounted.

In the specific case illustrated in FIG. 1, the references I, II, III, IV, V, VI, VII, R1 designate, respectively, gear wheels mounted so that they can turn freely on the first secondary shaft 2A or on the second secondary shaft 2B and can be coupled to the respective secondary shaft for selecting, respectively, the first, second, third, fourth, fifth, sixth, seventh gears and the reverse gear.

The gear wheel I meshes with a gear wheel 10 rigidly and permanently connected in rotation to the first primary shaft 1A, i.e., on the inner primary shaft, on an end portion thereof that extends beyond the end of the second primary shaft 1B.

The gear wheel II of the second gear meshes with a gear wheel 20 rigidly connected on the primary shaft 1B.

The gear wheel III of the third gear meshes with a gear wheel 30 rigidly connected on the primary shaft 1A.

The gear wheel IV of the fourth gear and the gear wheel VI of the sixth gear both mesh with one and the same gear wheel 46 rigidly connected on the primary shaft 1B.

The gear wheel V of the fifth gear and the gear wheel VII of the seventh gear both mesh with one and the same gear wheel 57 rigidly connected on the primary shaft 1A.

The selector devices for coupling in rotation each of the gear wheels I, II, III, IV, V, VI, VII, R1 are designated by the references S1/7, S2/6, S3/5, S4/R, each of said selectors being activatable in opposite directions for selecting different gears (the figures of the number that follows the reference S indicate the gears that can thus be selected).

The second forward gear is defined by a pair of gear wheels 20,11, the first connected permanently in rotation to the outermost primary shaft 1B and the other mounted so that it can turn freely on the second secondary shaft 2B and can be coupled in rotation therewith via a gear-engagement device schematically illustrated in the drawing and designated by the reference S2/6 (to indicate that said device selects in one direction the second gear and in the other direction the sixth gear).

The reverse gear is defined by the first reverse gear wheel R1, which is mounted so that it can turn freely on the first secondary shaft 2A and can be coupled in rotation therewith via the selection device S4/R, and by a second reverse gear wheel R2, which functions as idle gear for reversal of motion and meshes with the first gear wheel R1 (said meshing is represented schematically in the figures with a dashed line, this being possible owing to the fact that the two axes of the secondary shafts and the common axis of the primary shafts are not contained in one and the same plane). The second reverse gear wheel R2 is permanently connected in rotation to the gear wheel II of the second gear and is mounted so that it can turn freely therewith on the second secondary shaft 2B.

With the arrangement described above, engagement of the reverse gear is obtained by activating the selector device S4/R and leaving the selector device S2/6 inactive so as to leave the second reverse gear wheel R2 so that it can turn freely on the second secondary shaft 2B. In said situation, the motion coming from the outermost primary shaft 1B is transferred to the gear wheel II and from this to the gear wheel R2, to the gear wheel R1, and to the first secondary shaft 2A.

Figure 2:
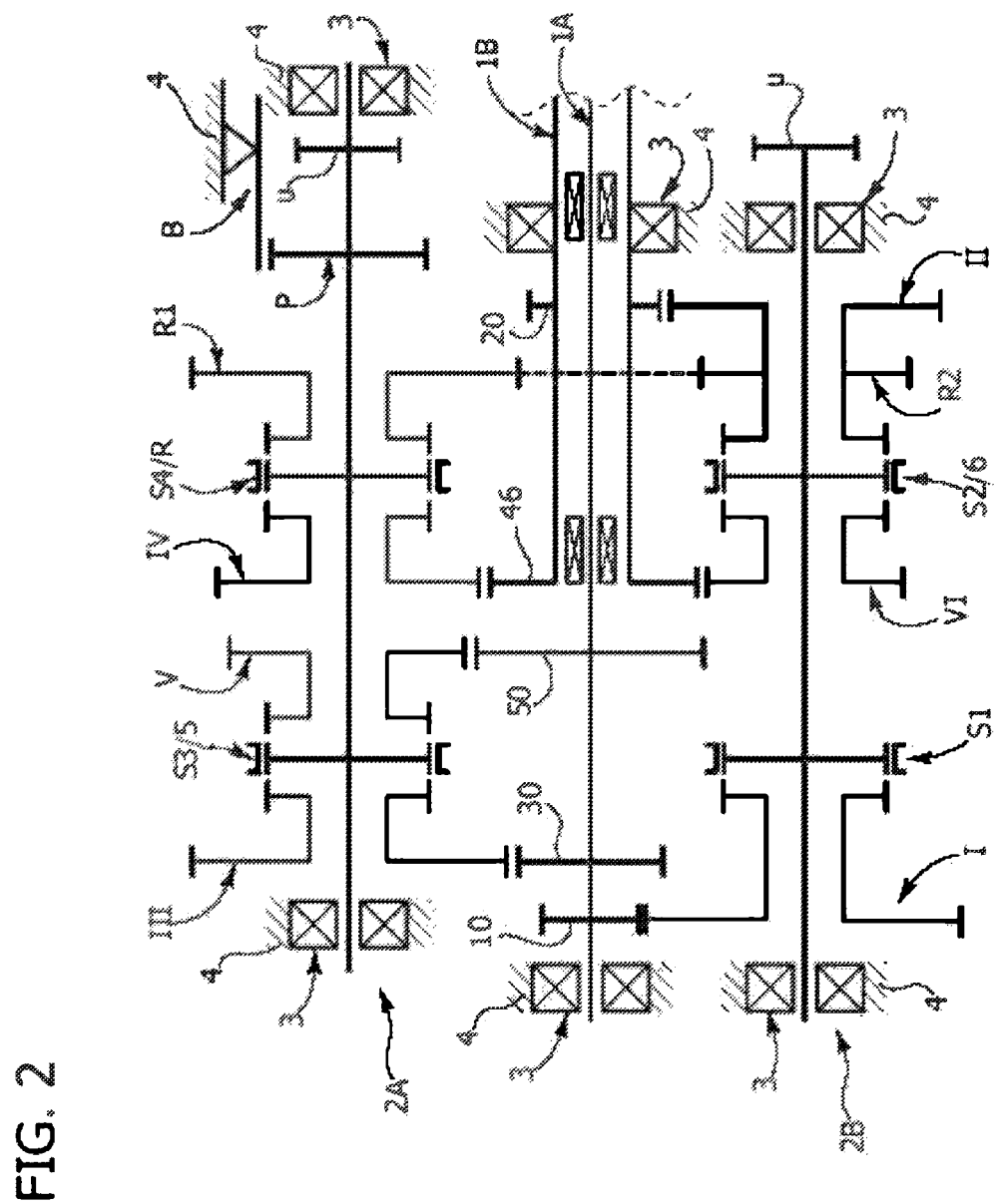
FIGS. 2 and 3 are diagrams of two further embodiments of the gear-change device according to the invention.

In all the solutions illustrated in FIGS. 1 and 2, rigidly mounted on the first secondary shaft 2A is a parking gear wheel P that co-operates with a parking device B, which can be of any known type (only schematically illustrated in the drawings) for locking the gear-change device in a parking condition.

According to the invention, the first secondary shaft 2A has its output pinion u set within the length between the two end bearings 3 that support the secondary shaft 2A in rotation, whilst said second secondary shaft 2B has its output pinion u set on the outside of the length between the two end bearings 3 that support the secondary shaft 2B in rotation. Said pinion u is set on a portion of the second secondary shaft 2B that projects in cantilever fashion beyond the bearing 3 adjacent thereto. Moreover, the parking gear wheel P has an axial position substantially displaced with respect to the axial position of the gear wheel II of the second gear on the second secondary shaft 2B in such a way that the first secondary shaft 2A is surrounded by a free space in the portion axially aligned with said gear wheel II of the second forward gear.

Figure 3:
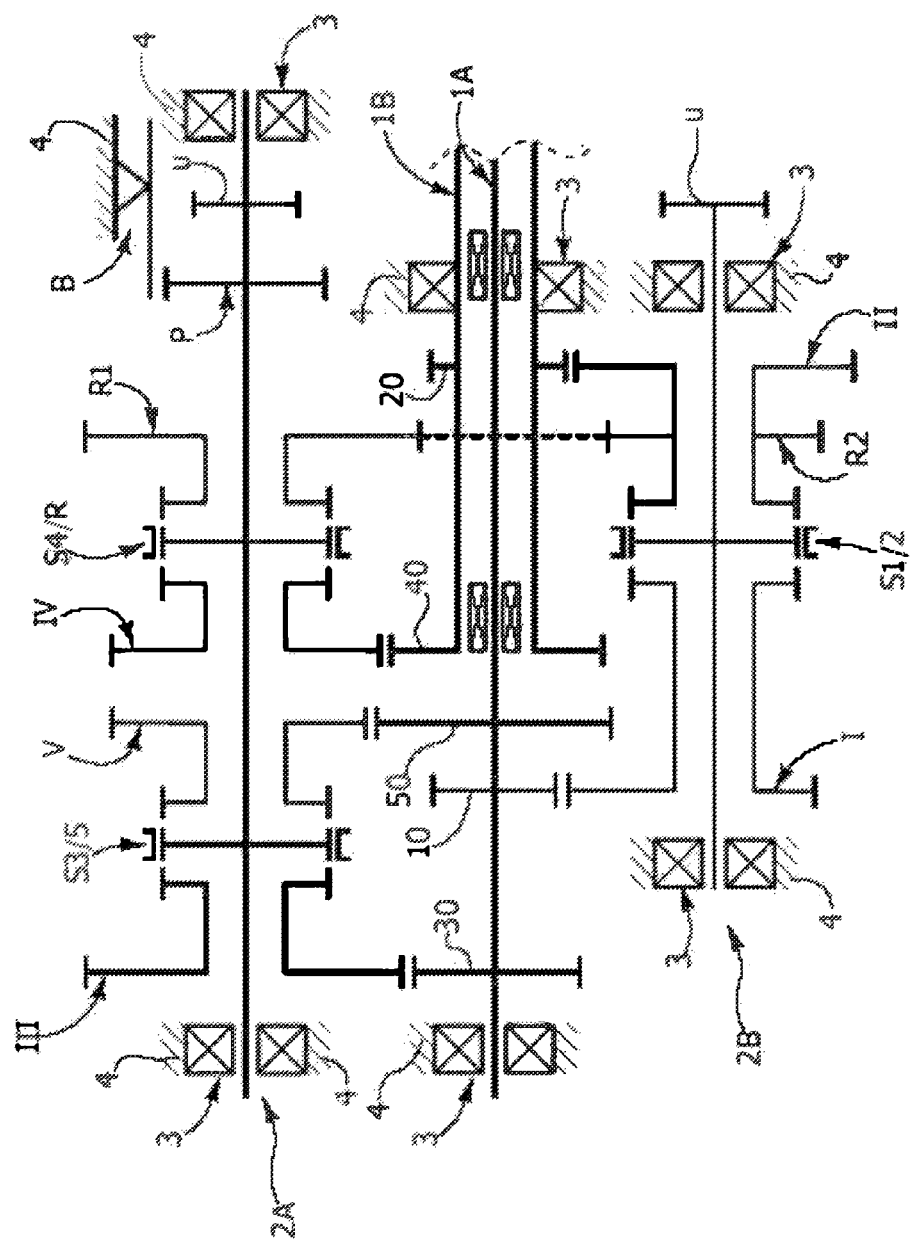

The above characteristics are present in all the solutions illustrated in FIGS. 1-3. Thanks to them, the gear wheel of the second gear can be made with a relatively large diameter without the need to enlarge the overall dimensions of the gear-change device so as to enable a transmission ratio of the second gear that is relatively close to the transmission ratio of first gear, which in some cases may be desirable. Moreover, the gear-change device according to the invention allows the designer a greater possibility of choice in arranging the various members of the gear-change, and in particular the members associated to the parking-lock device, according to the spaces available.

In the preferred of embodiment illustrated herein, the parking gear wheel P has an axial position substantially aligned with that of the bearing 3 that supports the second secondary shaft 2B adjacent to its output pinion u and with that of the bearing 3 that supports the outer primary shaft 1B.

The solutions illustrated in FIGS. 2 and 3 differ from that of FIG. 1 merely for the fact of providing only six gears (FIG. 2) or only five gears (FIG. 3). In said figures, the parts in common are designated by the same references. The gear-change with six gears of FIG. 2 differ from the one with seven gears of FIG. 1 simply as regards elimination of the gear wheel VII of the seventh gear so that the selector S1 operates only in one direction, for selection of the first gear. The gear-change with five gears of FIG. 3 differs from the one with six gears of FIG. 2 simply as regards elimination of the gear wheel VI of the sixth gear, so that a single selector S1/2 is provided for selecting the first and second gears.

In the embodiments of FIGS. 1 and 2, the first and second secondary shafts (2A, 2B) have the respective stretches comprised between the end bearings 3 substantially of the same length, but axially staggered with respect to one another. In the case of FIG. 3, the stretch of the second secondary shaft 2B comprised between the two end bearings 3 is shorter and is axially altogether contained within the stretch between the two bearings 3 of the first secondary shaft 2A.

Of course, without prejudice to the principle of the invention, the details of construction and the embodiments may vary widely with respect to what has been described and illustrated herein purely by way of example, without thereby departing from the scope of the present invention.

What is claimed is:

1. A gear-change device for a motor vehicle, comprising:
a first primary shaft and a second primary shaft, which are coaxial and can be connected selectively to an engine shaft of the motor vehicle of a double-clutch device;
a first secondary shaft and a second secondary shaft, axes of which are parallel and set at a distance from a common axis of said primary shafts, and which have respective output pinions that in axial positions aligned with one another;

a plurality of pairs of gear wheels, corresponding to a plurality of forward gears and to at least one reverse gear, wherein a first gear wheel of the gear wheels of each pair of gear wheels is rigidly connected in rotation to one of the primary shafts or to one of the secondary shafts while a second gear wheel of each pair is set so that said second gear wheel can turn freely on one of the secondary shafts or on one of the primary shafts, respectively;

a plurality of devices for selecting the gears for coupling each of said freely rotating gear wheels in rotation with the shaft on which it is mounted;

wherein the reverse gear is defined by:
- a first reverse gear wheel, which is mounted so that said first reverse gear wheel can turn freely on the first secondary shaft and can be connected in rotation to the first secondary shaft by one of said gear-selection devices in order to select the reverse gear;
- a second reverse gear wheel, which functions as an idle gear wheel for reversal of motion, which meshes with said first reverse gear wheel and is mounted so that said second reverse gear wheel can turn freely on the second secondary shaft, said second reverse gear wheel being permanently connected in rotation to a forward gear wheel that is mounted so that said second reverse gear wheel can turn freely on said second secondary shaft and meshes with a gear wheel rigidly connected in rotation on one of said primary shafts, wherein rigidly mounted on said first secondary shaft is a parking gear wheel co-operating with a locking device for locking the gear-change device in a parking condition;

said first secondary shaft having an output pinion set within the length between two end bearings that support said first secondary shaft in rotation, while said second secondary shaft has an output pinion set on an outside of the length between two end bearings that support said second secondary shaft in rotation, on a portion of the second secondary shaft that projects in cantilever fashion beyond the bearing adjacent thereto; and said parking gear wheel having an axial position substantially displaced with respect to the axial position of said forward gear wheel on the second secondary shaft in such a way that said first secondary shaft is surrounded by a free space in the portion axially aligned with said forward gear wheel.

2. The gear-change device according to claim 1, wherein said parking gear wheel has an axial position substantially aligned with that of the bearing that supports the second secondary shaft adjacent to the output pinion of the second secondary shaft and with that of a bearing that supports the outer primary shaft.

3. The gear-change device according to claim 1, wherein each of said first secondary shaft and said second secondary shaft have respective stretches comprised between end bearings of said first secondary shaft and said second secondary shaft, said stretches being substantially of a same length, and set axially staggered with respect to one another.

4. The gear-change device according to claim 1, wherein a stretch of the second secondary shaft comprised between two end bearings thereof is shorter and is axially altogether contained within the stretch between the two bearings of the first secondary shaft.

5. The gear-change device according to claim 2, wherein a stretch of the second secondary shaft comprised between two end bearings thereof is shorter and is axially altogether contained within the stretch between the two bearings of the first secondary shaft.

\* \* \* \* \*